United States Patent [19]
Graf et al.

[11] Patent Number: 5,634,531
[45] Date of Patent: Jun. 3, 1997

[54] ELECTRICALLY POWERED AUTOMATIC LUBRICANT DISPENSER

[75] Inventors: Walter Graf, Euerdorf; Ulrich Immisch, Bad Kissingen, both of Germany

[73] Assignee: Satzinger GmbH & Co., Euerdorf, Germany

[21] Appl. No.: 567,227

[22] Filed: Dec. 5, 1995

[51] Int. Cl.⁶ ................................................. F16N 7/14
[52] U.S. Cl. ........................ 184/37; 184/38.4; 184/7.4; 184/108; 222/333; 222/390
[58] Field of Search ................ 184/37, 38.4, 27.1, 184/7.4, 108; 222/228, 46, 390, 333

[56] References Cited

U.S. PATENT DOCUMENTS

| | | | |
|---|---|---|---|
| 3,561,565 | 2/1971 | Woor | 184/7.4 |
| 4,260,076 | 4/1981 | Bergman | 222/390 |
| 4,770,613 | 9/1988 | Hoover et al. | 184/105.2 |
| 5,509,501 | 4/1996 | Damme | 184/7.4 |

FOREIGN PATENT DOCUMENTS 42 09 776  9/1993  Germany.
43 31 947  11/1994  Germany.

*Primary Examiner*—Thomas E. Denion
*Attorney, Agent, or Firm*—Herbert Dubno; Andrew Wilford

[57] ABSTRACT

An automatic lubricant dispenser has a vessel adapted to hold a supply of a fluent lubricant and having one side formed with an outlet adapted to be connected to a machine to be lubricated and an opposite side, a piston in the vessel movable forward toward the one side to force the lubricant from the outlet, and an electric drive connected to the piston and electrically energizable to advance the piston forward. An electric power source is connected via an electrical circuit to the drive for periodically energizing the drive and thereby advancing the piston an increment and pumping a dose of the lubricant from the outlet.

15 Claims, 5 Drawing Sheets

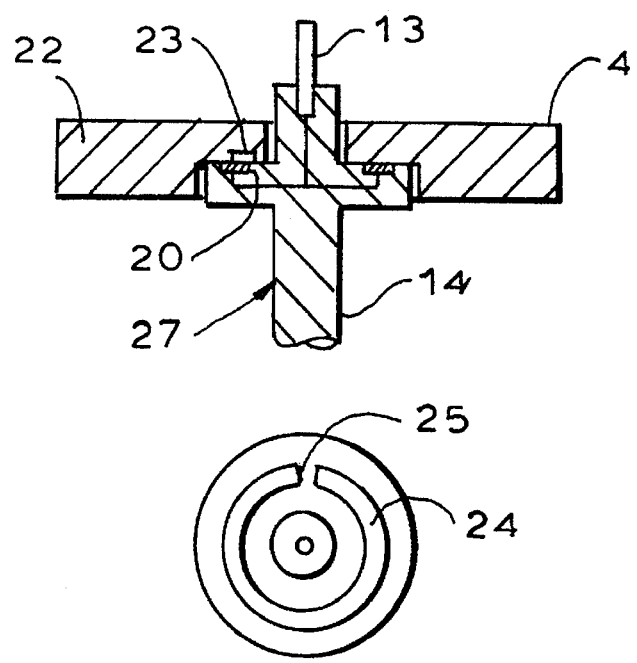
FIG. 3A
FIG. 3B
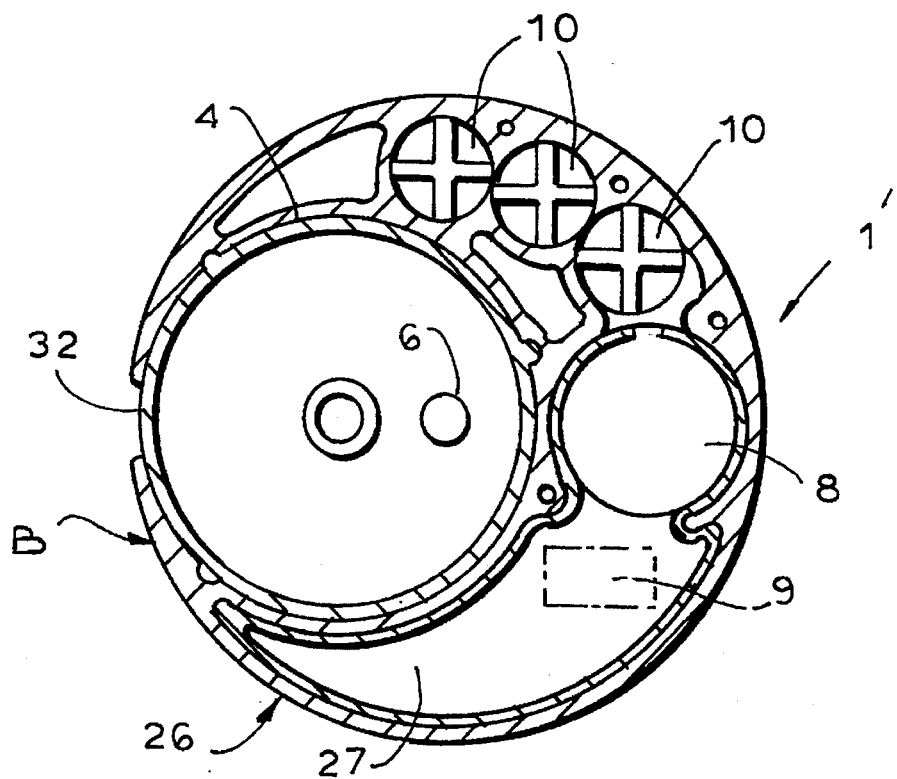
FIG. 6

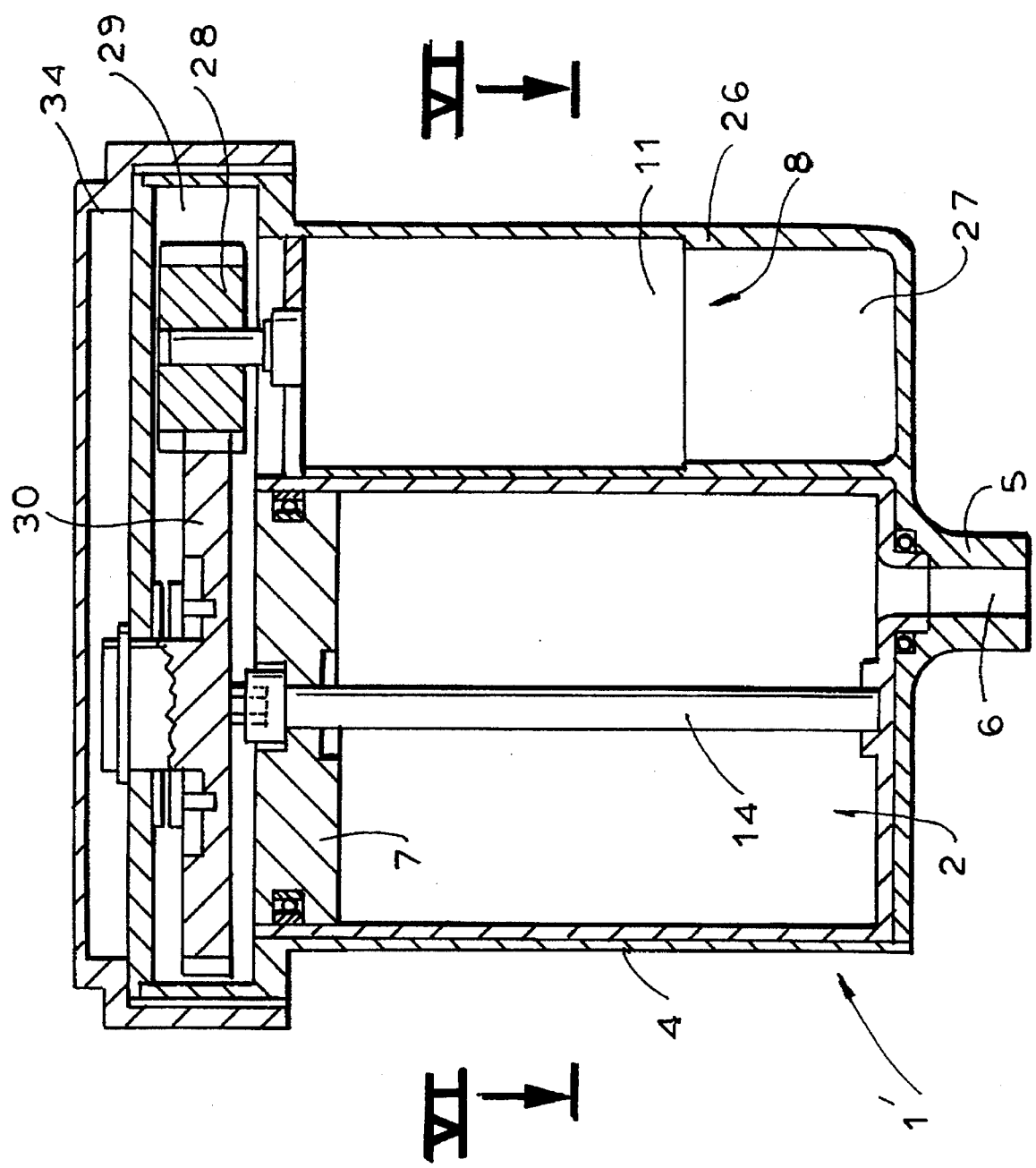

ELECTRICALLY POWERED AUTOMATIC LUBRICANT DISPENSER

FIELD OF THE INVENTION

The present invention relates to an automatic lubricant dispenser. More particularly this invention concerns such a dispenser which is hooked to a machine needing periodic lubrication, e.g. a pump, so as to automatically furnish thereto predetermined doses of a fluent lubricant.

BACKGROUND OF THE INVENTION

It is known to provide a piece of machinery with an automatic lubricant dispenser that is pressurized to force a fluent lubricant, normally an oil or grease, along a conduit into a part, typically a bearing, of the machine. In order to avoid having to provide a pump it has been suggested to provide a gas-generating cell which pressurizes the lubricant by means of a chemical reaction that can be initiated by the user when the dispenser is connected to the machine, and that generates sufficient gas to deplete the entire supply of lubricant in the dispenser.

In commonly owned U.S. Pat. Nos. 5,386,883 and 5,409,084 such a dispenser is described which has a vessel adapted to hold a supply Of a fluent lubricant and having one side formed with an outlet adapted to be connected via a conduit to a machine to be lubricated and another open side and a cover engaged over the other side and fitted with a cap fittable snugly like a piston in the vessel and forming with the cover a substantially closed chamber holding a supply of a reactive liquid. The cover is formed with a seat opening into the chamber. A gas-generating cartridge fits into the seat and has an element capable of reacting with the liquid and forming a gas. A removable partition closes the seat and segregates it from the liquid-holding chamber. The cartridge is constructed so as to remove the partition and contact the element with the liquid for generating gas in the chamber and forcing the cap like a piston away from the cover into the vessel to pressurize the fluent lubricant therein.

In all of these systems the activation is nonreversible, that is once the partition is removed or destroyed, the gas-generating reaction is started and cannot be stopped. Thus if the machine is to be taken out of service for a long time, it becomes necessary to replace the lubricant dispenser before restarting the machine, since the gas will all have leaked away. Similarly even if the machine is sitting idle, the automatic lubricant dispenser continues to toil away, periodically feeding new lubricant to the down machine, a clear waste. Finally the gas-type pressurizing cartridge is a disposal problem when depleted, and cannot be renewed or reused.

OBJECTS OF THE INVENTION

It is therefore an object of the present invention to provide an improved automatic lubricant dispenser.

Another object is the provision of such an improved automatic lubricant dispenser which overcomes the above-given disadvantages, that is which is set up to dispense the lubricant only when needed, normally when the machine is running.

SUMMARY OF THE INVENTION

An automatic lubricant dispenser has according to the invention a vessel adapted to hold a supply of a fluent lubricant and having one side formed with an outlet adapted to be connected to a machine to be lubricated and an opposite side, a piston in the vessel movable forward toward the one side to force the lubricant from the outlet, and an electric drive connected to the piston and electrically energizable to advance the piston forward. An electric power source is connected via an electrical circuit to the drive for periodically energizing the drive and thereby advancing the piston an increment and pumping a dose of the lubricant from the outlet.

The electrical source can be a battery or a simple transformer. When a battery is used it is ideally of the rechargeable type. A transformer is of interest when it is supplied power when and only when the machine being lubricated is also turned on, so that the automatic lubrication is only effective when the machine is on. Either way the dispenser according to this invention can be recharged and reloaded, unlike the prior-art single-use units.

The drive can include a linear induction motor having a stator fixed to the housing and a reaction part connected via a lever system to the piston. Alternately it is an electrical stepping motor connected via the circuit to the source and having an output element. A force-transmitting coupling between the output element and the piston can include a step-down transmission connected to a rotary output shaft of the motor. Both linear induction and stepping motors are relatively insensitive to the value of the actuating voltage so long as it exceeds a predetermined minimum, so that each actuation of the drive means will output the same amount of lubricant regardless of the viscosity of the lubricant or the voltage of the actuating current.

The circuit includes a switch connected between the output shaft and the housing and operable at least once for each revolution of the shaft. This switch can include a pair of electrically conductive and mutually engageable contact elements, one fixed to and rotatable with the shaft and the other fixed to the housing. According to the invention one of the elements is an arcuate contact strip centered on an axis of the shaft and formed with a gap and the other element is a wiper engaging the strip and falling in the gap out of electrical contact with the strip in a predetermined angular position of the shaft in the housing. The shaft can carry a cam that contacts and operates the switch in a predetermined angular position of the shaft. The shaft is threaded into the piston so that rotation of the shaft moves the piston in the housing.

The circuit in accordance with this invention includes a clock for periodically energizing the drive means. This circuit means is a programmable microprocessor so that the period of the clock, which determines the frequency of the lubricant doses delivered to the machine, is adjustable. Normally the circuit includes a converter connected between the microprocessor and the drive means and serving to boost an output of the microprocessor to power the drive. The converter can be a simple switching transistor, a relay, or the like that receives a low-voltage and low-current input and feeds a substantially larger voltage and current to the motor.

The circuit also includes means for outputting an alarm when the electrical energy of the source is barely sufficient to operate the drive. This function can be built right into the timer microprocessor, or can be carried out by a separate unit. The alarm can be a simple photodiode that illuminates to signal that the voltage of the lubricant dispenser is getting dangerously low, or it can be connected to the machine's control panel to illuminate a light or sound a buzzer thereon.

In accordance with this invention the housing includes one part containing the drive and source and another part holding the piston and the lubricant supply. The parts are separable from each other and the one part can be provided on the end of the other part. It is also possible for the other part to be generally cylindrical and the one part to be of crescent section and partially surrounds the other part. In this case the source is batteries in the one part and the one part extends in an end part over the one part and the end part contains a transmission forming a part of the drive means. Furthermore the electrical motor provided in the one part is flanked in the one part on one side by the source and on the other side by the circuit means. The housing includes an outer part forming the one part and an inner part holding the lubricant supply and forming the one part. The outer part is formed with a slot through which the inner part is visible. The outer part is made of plastic. This way the lubricant-holding part can be switched for a full one and/or refilled, making the device wholly reusable.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 3A is a large-scale view of a detail of the dispenser of FIG. 1;

FIG. 3B is a top view of an element of FIG. 3;

FIG. 5 is a view like FIG. 1 of another dispenser according to the invention;

FIG. 6 is a cross section taken along line VI—VI of FIG. 5;

SPECIFIC DESCRIPTION

Figure 1:
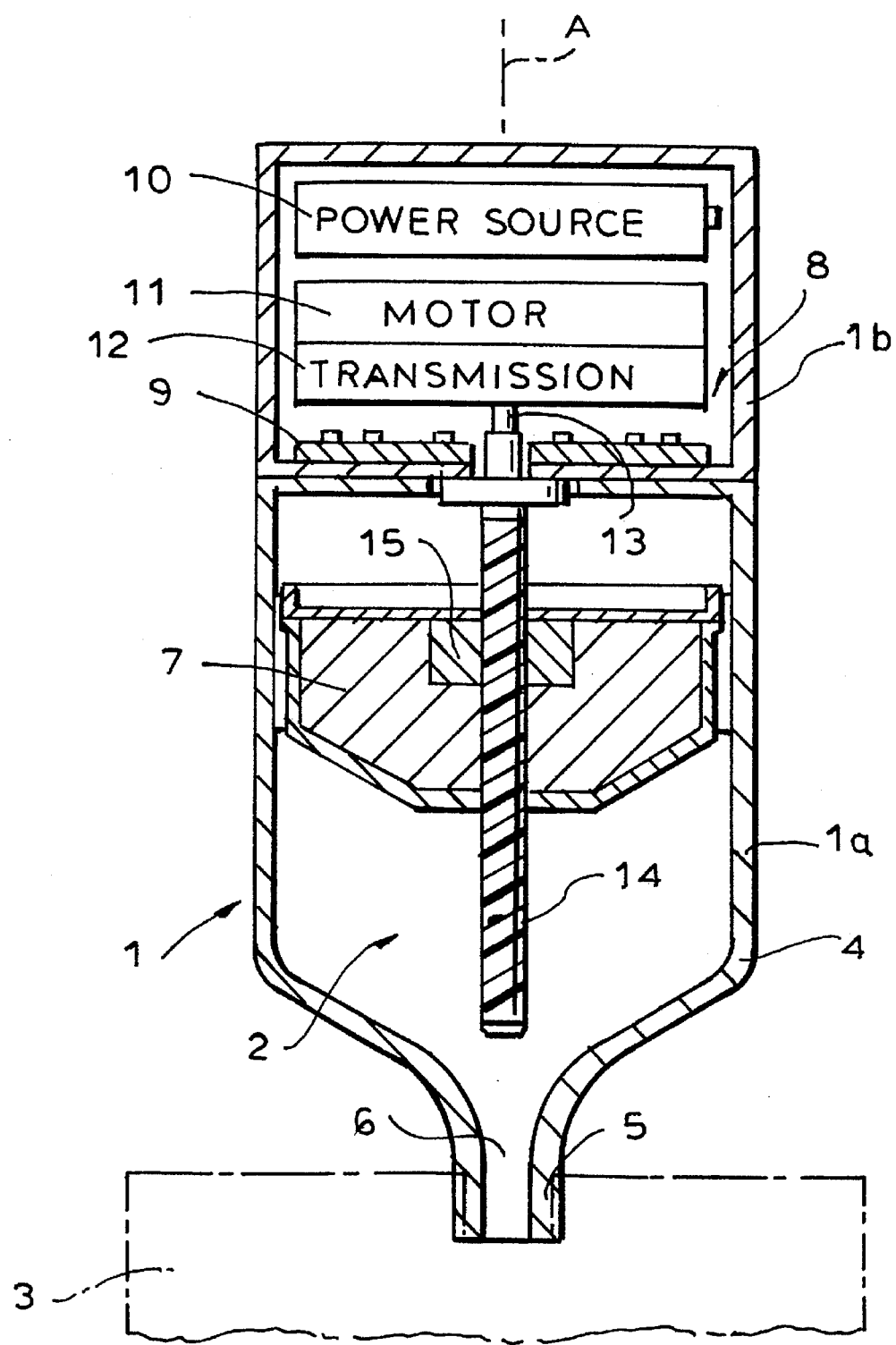
FIG. 1 is an axial section through the automatic dispenser according to the invention.

As seen in FIG. 1 an automatic lubricant dispenser according to the invention has a basically cylindrical housing or vessel 4 centered on a normally upright axis A and having a lower housing part 1a formed with an outlet nipple 5 defining an outlet opening 6 and normally connected to a machine 3 to be lubricated. The housing 4 holds a body 2 of the lubricant and has an axially displaceable piston 7 that can be moved axially forward (here down) to force the lubricant 2 out the outlet 6 to the machine 3.

Inside an upper part 1b of the housing 4 is an electric drive 8 and a control circuit 9 therefor. The drive 8 comprises an electrical motor 11 and a step-down transmission 12. The circuit 9 supplies power from a source 10, here a rechargeable battery, to the motor 11 to periodically operate it and rotate its output shaft 13 about the axis A. This shaft 13 is connected to a threaded spindle 14 received in a threaded nut 15 in the piston 7. The piston 7 is constrained (e.g. by an unillustrated axially extending rib) from rotating in the housing 4 so that, when the shaft 13 rotates the spindle 14, the piston 7 is moved axially.

Figure 2:
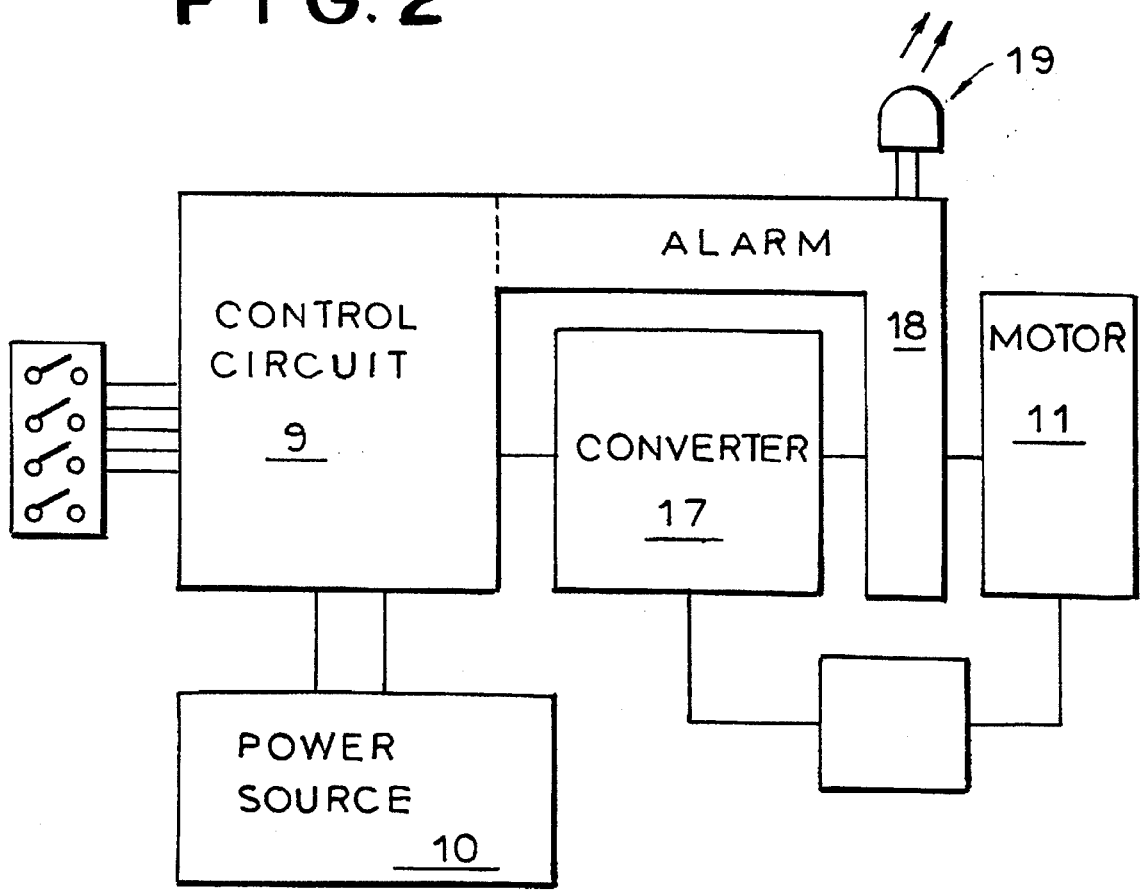
FIG. 2 is a schematic diagram of elements of the dispenser.

As shown in FIG. 2 the control circuit 9 is a microprocessor having a timer that can be programmed by a switch arrangement 16 acting as input. The control-circuit emits an output that is converted by a device 17 to a voltage sufficient to power the motor 11. An alarm 18 connected between the converter 17 and the motor 11 can actuate an alarm device 19, here a photodiode, when the voltage outputted by the converter 17 is too low. Thus when the dispenser 1 is about to fail from lack of electrical power, it can emit a signal that will indicate to the user that it needs replacement or its batteries need recharging.

More specifically as shown in FIGS. 3A and 3B, the circuit 9 includes a rotor 21 fixed on the shaft 13 and a stator disk 22 secured in the housing 4 and forming a switch 20 with the stator 22. The rotor 21 carries an arcuate contact 24 and the stator 22 a wiper 23 together forming the switch 20. The arcuate contact 24 is formed with a gap 25 that is angularly wider than the wiper 23 so that when the wiper 23 is positioned in this gap 25 the switch 20 is open.

Figure 4:
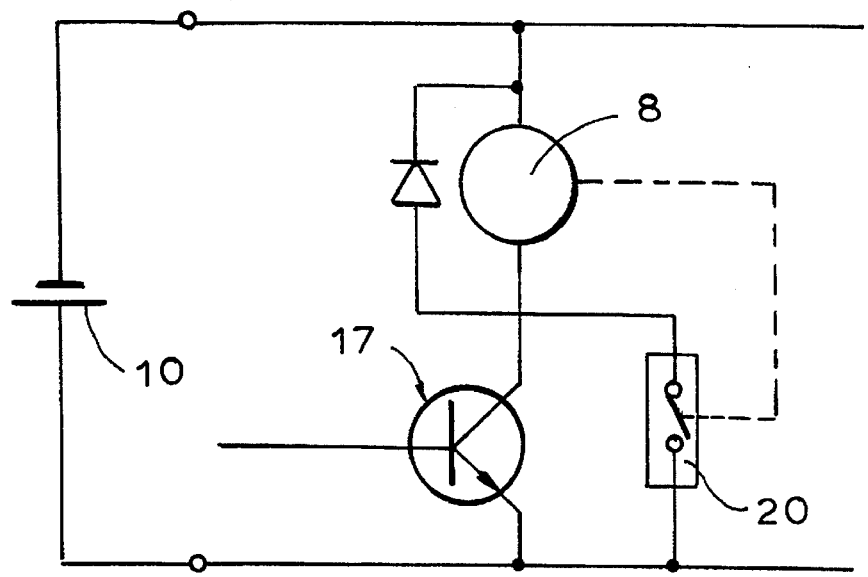
FIG. 4 is a circuit diagram illustrating part of the control circuit for the dispenser.

FIG. 4 shows how the switch 17 is connected across the output of the converter 17, here constituted as an NPN switching transistor. During normal operation the converter 17 is set to emit a voltage pulse only sufficient to operate the motor 8 long enough to move the wiper 23 out of the gap 25, whereupon the switch 20 is closed and the motor 8 is operated directly off the battery 10 until the wiper 23 again falls into the gap 25, at which time the motor 8 stops.

FIGS. 5 and 6 show a dispenser 1' with an outside housing 26 formed with a large-diameter cylindrical compartment 33 receiving the housing 4 and a crescent-shaped compartment 27 surrounding the compartment 33 and holding the motor 11 with the batteries 10 on one side and the circuit 9 on the other. The end of the housing 26 forms a gear compartment 29 housing a small-diameter drive pinion 28 on the motor 8 and a large-diameter output gear 30 on the shaft 14. Another cover 31 is secured to the top end of the housing 26 to hold the elements in place and the side of the housing 32 is formed at the compartment 33 with a split 32 allowing the housing 4 to be fitted snugly in place and permitting the fill level of the housing 4, which is made of clear plastic, to be seen.

Figure 7:
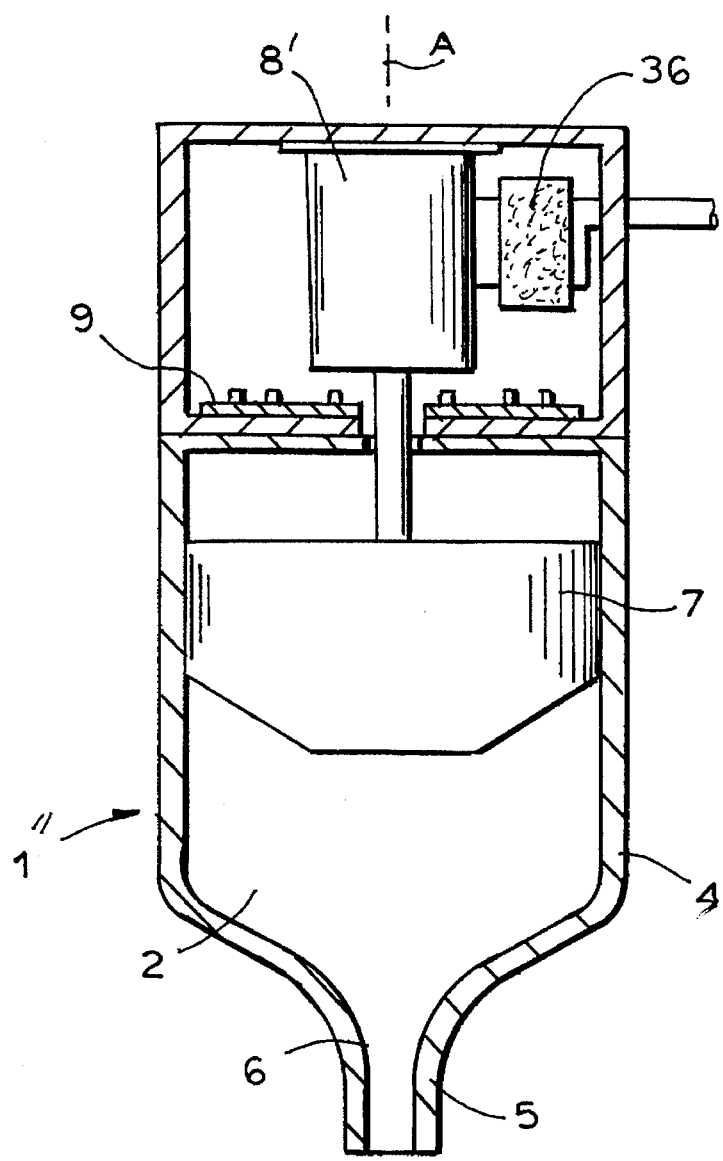
FIG. 7 is a view like FIG. 1 of yet another dispenser in accordance with this invention.

FIG. 7 shows a dispenser 1" having a linear induction motor 8' mounted on the housing 4 and connected via a shaft 14' to the piston 7. This motor 8' moves the piston 7 along the axis A directly. It is powered by a transformer 36 whose primary is connected in parallel with the motor of the machine 3 so that whenever the machine 3 is turned on the automatic lubrication is activated.

Figure 8:
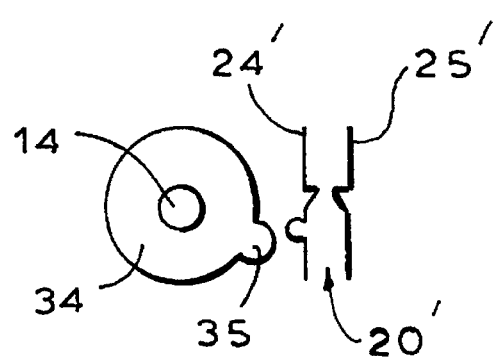
FIG. 8 is a detail view on a variant on the system of FIG. 1.

In FIG. 8 the shaft 14 is shown carrying a cam 34 having a lobe 35 that can push contacts 23' and 24' forming a switch 20' equivalent to the switch 20 together. When this switch 20 is closed the motor is stopped.

We claim:

1. An automatic lubricant dispenser comprising:
   a housing adapted to hold a supply of a fluent lubricant and having one side formed with an outlet adapted to be connected to a machine to be lubricated and an opposite side;
   a piston in the vessel movable forward toward the one side to force the lubricant from the outlet;
   drive means including
      an electrical motor having a rotary output shaft, and
      a force-transmitting coupling between the shaft and the piston, the motor being electrically energizable able to advance the piston forward;

an electric power source; and means including an electrical circuit between the source and the motor and including a pair of electrically conductive and mutually engageable contact elements for periodically energizing the motor from the source and thereby advancing the piston an increment and pumping a dose of the lubricant from the outlet, one of the elements being fixed to and rotatable with the shaft and the other fixed to the housing, one of the elements being an arcuate contact strip centered on an axis of the shaft and formed with a gap and the other element being a wiper engaging the strip and falling in the gap out of electrical contact with the strip in a predetermined angular position of the shaft in the housing.

2. The automatic lubricant dispenser defined in claim 1 wherein the coupling includes a step-down transmission.

3. The automatic lubricant dispenser defined in claim 1 wherein the shaft is threaded into the piston, whereby rotation of the shaft moves the piston in the housing.

4. The automatic lubricant dispenser defined in claim 1 wherein the circuit means includes a clock for periodically energizing the drive means.

5. The automatic lubricant dispenser defined in claim 4 wherein the circuit means is a programmable microprocessor, the period of the clock being adjustable.

6. The automatic lubricant dispenser defined in claim 5 wherein the circuit means includes a converter connected between the microprocessor and the drive means and serving to boost an output of the microprocessor to power the drive means.

7. The automatic lubricant dispenser defined in claim 1 wherein the circuit means includes means for outputting an alarm when the electrical energy of the source is barely sufficient to operate the drive means.

8. The automatic lubricant dispenser defined in claim 1 wherein the housing includes one part containing the drive means and source and another part holding the piston and the lubricant supply, the parts being separable from each other.

9. The automatic lubricant dispenser defined in claim 8 wherein the one part is provided on the end of the other part.

10. The automatic lubricant dispenser defined in claim 8 wherein the other part is generally cylindrical and the one part is of crescent section and partially surrounds the other part.

11. The automatic lubricant dispenser defined in claim 10 wherein the source is batteries in the one part.

12. The automatic lubricant dispenser defined in claim 10 wherein the one part extends in an end part over the one part and the end part contains a transmission forming a part of the drive means.

13. The automatic lubricant dispenser defined in claim 12 wherein the drive means includes an electrical motor in the one part and the electrical motor is flanked in the one part on one side by the source and on the other side by the circuit means.

14. The automatic lubricant dispenser defined in claim 10 wherein the housing includes an outer part forming the one part and an inner part holding the lubricant supply, the outer part being formed with a slot through which the inner part is visible.

15. The automatic lubricant dispenser defined in claim 14 wherein the outer part is made of plastic.

\* \* \* \* \*